US012715009B2

(12) United States Patent
Eisenschmid

(10) Patent No.: US 12,715,009 B2

(45) Date of Patent: Aug. 25, 2026

(54) CENTRIFUGAL SEPARATOR

(71) Applicant: Syntegon Technology GmbH, Waiblingen (DE)

(72) Inventor: Ralph Eisenschmid, Marbach am Neckar (DE)

(73) Assignee: Syntegon Technology GmbH, Waiblingen (DE)

( * ) Notice: Subject to any disclaimer, the term of this patent is extended or adjusted under 35 U.S.C. 154(b) by 378 days.

(21) Appl. No.: 18/503,428

(22) Filed: Nov. 7, 2023

(65) Prior Publication Data

US 2024/0157375 A1 May 16, 2024

(30) Foreign Application Priority Data

Nov. 14, 2022 (DE) ..................... 10 2022 130 081.1

(51) Int. Cl.

| | |
|---|---|
| ***B04C 5/081*** | (2006.01) |
| ***B04C 5/04*** | (2006.01) |
| ***B04C 5/103*** | (2006.01) |
| ***B04C 5/13*** | (2006.01) |
| ***B04C 5/14*** | (2006.01) |

(52) U.S. Cl.

CPC ................ *B04C 5/081* (2013.01); *B04C 5/04* (2013.01); *B04C 5/103* (2013.01); *B04C 5/13* (2013.01); *B04C 5/14* (2013.01)

(58) Field of Classification Search

CPC .......... B04C 5/081; B04C 5/04; B04C 5/103; B04C 5/13; B04C 5/14; B04C 5/181

USPC ....................................................... 210/512.1

See application file for complete search history.

(56) References Cited

U.S. PATENT DOCUMENTS

| | | | |
|---|---|---|---|
| 1,798,510 A | 3/1931 | Winslow et al. | |
| 3,558,484 A * | 1/1971 | Carr | B04C 5/12 55/400 |
| 3,996,027 A | 12/1976 | Schnell et al. | |

(Continued)

FOREIGN PATENT DOCUMENTS

| | | |
|---|---|---|
| DE | 4990 M | 10/1951 |
| DE | 2809575 | 9/1978 |
| DE | 102017113888 | 9/2018 |

(Continued)

OTHER PUBLICATIONS

Selecting the right centrifuge by Nils Schwarz (Year: 2008).*

(Continued)

*Primary Examiner* — Ekandra S. Miller-Cruz

(74) *Attorney, Agent, or Firm* — Michael Best & Friedrich LLP

(57) ABSTRACT

A centrifugal separator (10) includes a housing (12), which extends along a central axis (14) and has a separating chamber wall (24) for delimiting a separating chamber (26) that is fed by an inlet channel (44) for polyphasic fluid. A central immersion tube (50) is provided for discharging a first fluid phase and an outlet channel (54) is provided for discharging a second fluid phase. An expansion chamber (30), which widens radially outward with respect to the separating chamber and is radially outwardly delimited by an expansion chamber wall (30), is provided between the separating chamber and the outlet channel, The separating chamber conically widens from the inlet channel, as seen along the central axis, toward the expansion chamber.

10 Claims, 4 Drawing Sheets

(56) References Cited

U.S. PATENT DOCUMENTS 5,461,868 A 10/1995 Finko

FOREIGN PATENT DOCUMENTS

| | | |
|---|---|---|
| EP | 0676599 A1 | 10/1995 |
| GB | 1185274 | 3/1970 |
| JP | 4978875 B2 | 7/2012 |

OTHER PUBLICATIONS

Main geometric parameters of centriduge by SUEZ degremont water handbook (Year: 2021).*

Translatio of Aktiebola_GB1185274A_1970_ (Year: 1970).*

Translation_of_Tonguren_DET4990MAZ_1951 (Year: 1951).*

European Patent Office Search Report for Application No. 23203123.7 dated Mar. 7, 2024 (14 pages including English machine translation).

Office Action for German Application No. 10 2022 130 081.1 mailed on Jun. 20, 2023 (Original and English Translation, 10 pages).

* cited by examiner

CENTRIFUGAL SEPARATOR

BACKGROUND

The invention relates to a centrifugal separator comprising a housing, which extends along a central axis and has a separating chamber wall for delimiting a separating chamber that is fed by an inlet channel for polyphasic fluid, wherein a central immersion tube is provided for discharging a first fluid phase (light fraction) and an outlet channel is provided for discharging a second fluid phase (heavy fraction), wherein an expansion chamber, which widens radially outward with respect to the separating chamber and is radially outwardly delimited by an expansion chamber wall, is provided between the separating chamber and the outlet channel.

DE 10 2017 113 888 B3 discloses centrifugal separators which extend along a central axis and have a separating chamber and an expansion chamber.

Centrifugal separators of this type are generally used to separate fluid phases of different densities (what are referred to as the light fraction and heavy fraction) of a polyphasic fluid by separating the heavy fraction.

To achieve the separation action, the polyphasic fluid is fed to the separating chamber via an inlet channel and guided in such a way that a rotating flow forms inside the separating chamber. The centrifugal forces that arise cause a radial acceleration, in particular of the heavy fraction, and the deposition of the heavy fraction on an inner side of a separating chamber wall.

After the separating operation, the constituents of the heavy fraction are transported away and slide in particular on spiral paths along the inner side of the separating chamber wall toward the expansion chamber until they are accommodated in the expansion chamber. There, the rotational movement decelerates and the heavy fraction is discharged from the centrifugal separator via an outlet channel connected to the expansion chamber.

The separating chamber of the centrifugal separator in DE 10 2017 113 888 B3 has a form which conically tapers from the inlet channel toward the expansion chamber. The tapering of the separating chamber has the effect of increasing the rotational speed of the fluid along the central axis. This leads to an increase in the centrifugal forces acting on the fluid phases and an improved separation action.

SUMMARY

The invention is based on the object of specifying a centrifugal separator having a separating chamber which—as far as possible maintaining the separation action of conventional centrifugal separators—enables improved and more reliable transport of the denser fluid phase (heavy fraction) away from the separating chamber.

This object is achieved in the case of a centrifugal separator of the type mentioned in the introduction in that the separating chamber conically widens from the inlet channel, as seen along the central axis, toward the expansion chamber.

According to the invention, it was found that a disadvantage of the centrifugal separator known from DE 10 2017 113 888 B3 is that a component of the centrifugal force acts on the constituents of the heavy fraction that have been deposited on the inner side of the separating chamber wall and is operative counter to the desired direction of movement (that is to say, acts in the direction of the inlet channel). This makes undesired operating states possible, during which constituents of the heavy fraction do not move toward the expansion chamber or the outlet channel but remain on constant circular paths along the inner side of the separating chamber wall or even are accelerated toward the inlet channel. Since the heavy fraction is thus not transported away, what can happen is that the heavy fraction builds up in the separating chamber and the rotating flow breaks down.

The conical widening according to the invention of the separating chamber means that a component of the centrifugal force acts on the constituents of the heavy fraction that are deposited on the inner side of the separating chamber wall always toward the expansion chamber or the outlet channel. As a result, the separated constituents of the heavy fraction are accelerated toward the expansion chamber during operation of the centrifugal separator and the rate at which they are transported away from the separating chamber into the expansion chamber significantly increases. In particular, the aforementioned undesired operating states are prevented in this way.

Surprisingly, it has been found that the separating action of the centrifugal separator remains the same in spite of the deceleration of the fluid along the central axis associated with the conical widening. The centrifugal forces that arise and act on the heavy fraction are furthermore large enough to achieve a radial acceleration of the heavy fraction.

In a preferred embodiment, an angle of inclination, measured relative to the central axis, of the separating chamber wall is between 2° and 20°, in particular between 2.5° and 15°. This constitutes the optimum angular range in which the component of the centrifugal force is large enough to accelerate the denser phase (heavy fraction) toward the expansion chamber and at the same time ensure the formation of a stable rotating flow in the separating chamber and an effective separation action.

Particularly preferably, the immersion tube extends over at most 60% of a length, measured along the central axis, of the separating chamber. In particular owing to a delimitation of the expansion chamber at the bottom, the light fraction of the polyphasic fluid undergoes a flow reversal and, rotating about the central axis, is discharged from the separating chamber via the immersion tube. If the immersion tube extends over at most 60% of the length, measured along the central axis, of the separating chamber, the distance from the delimitation of the expansion chamber at the bottom makes it possible for a particularly stable flow reversal to form, as a result of which a particularly effective discharge of the first fluid phase (light fraction) is ensured.

It is also preferred if the ratio between a length, measured along the central axis, of the separating chamber and a largest diameter of the separating chamber is between 6:1 and 1:1. This constitutes the range of ratios in which a rotating flow of the fluid that is as homogeneous and stable as possible is achieved.

A preferred embodiment provides that the expansion chamber comprises a fluid discharge section, which is spaced apart from the central axis, is on the bottom and, with respect to an orientation perpendicular to the central axis, has a slope which is similar to a screw thread and assists the discharge of the second fluid phase.

It is possible in particular to operate the centrifugal separator in a configuration in which the flow of the fluid extends along the direction of gravitational force (the central axis is aligned parallel to the direction of gravitational force in this case). A slope similar to a screw thread causes a component of the gravitational force to act on constituents of the heavy fraction that have reached the delimitation of the expansion chamber at the bottom in the form of a downhill force toward the outlet channel.

It is also preferred if the outlet channel has a bottom section which, with respect to an orientation perpendicular to the central axis, has an outlet channel slope which assists the discharge of the second fluid phase, in particular in the direction of gravitational force. The outlet channel slope causes a component of the gravitational force in the form of a downhill force to act on the constituents of the heavy fraction that are arranged on the bottom section, as a result of which the discharge of the heavy fraction is assisted.

In particular, it is preferred if the expansion chamber has a fluid guiding section which extends around the central axis in frustoconical or pagoda-shaped fashion and is on the bottom. In the expansion chamber, operating states are possible in which a heavy fraction proportion rotates stably close to the central axis and as a result does not reach the outlet channel. The frustoconical or pagoda-shaped fluid discharge section forms an oblique surface around the central axis, the oblique surface guiding the heavy fraction proportion radially outward, in particular toward the outlet channel. Moreover, the oblique surface serves to guide the light fraction proportion radially inward, thus toward the central axis, along which the immersion tube extends.

It is also preferred if the inlet channel has a boundary wall, which is on the outside with respect to the central axis and tangentially adjoins a section of the separating chamber wall and/or if the outlet channel has a boundary wall, which is on the outside with respect to the central axis and tangentially adjoins a section of the expansion chamber wall. The tangentially arranged outer boundary wall of the inlet channel causes the polyphasic fluid to rotate along the separating chamber wall and about the central axis already as it is being fed in. The tangentially arranged boundary wall of the outlet channel enables a particularly efficient discharge of the heavy fraction from the expansion chamber.

It is furthermore preferred if the inlet channel has a rectangular cross section and/or if the outlet channel has a rectangular cross section. The cross-sectionally rectangular inlet channel makes it possible to form the rotating flow of the fluid in ideal fashion as the fluid is being fed into the separating chamber. The cross-sectionally rectangular outlet channel is matched in particular to the design of the expansion chamber.

Particularly preferably, an annular transition region between one end of the separating chamber wall and a boundary section covering the expansion space is sharp-edged or rounded. The heavy fraction remains in the expansion space beyond the transition region after the transition from the separating chamber to the expansion chamber and in particular cannot go back into the separating chamber. The configuration of the annular transition region makes it possible to control the behavior of the heavy fraction at the transition from the separating chamber to the expansion chamber and in particular to control the deceleration of the rotational movement.

BRIEF DESCRIPTION OF THE DRAWINGS

Further features and advantages are the subject of the following description and of the diagrammatic illustration of embodiments.

In the drawing.

DETAILED DESCRIPTION

Figure 1:
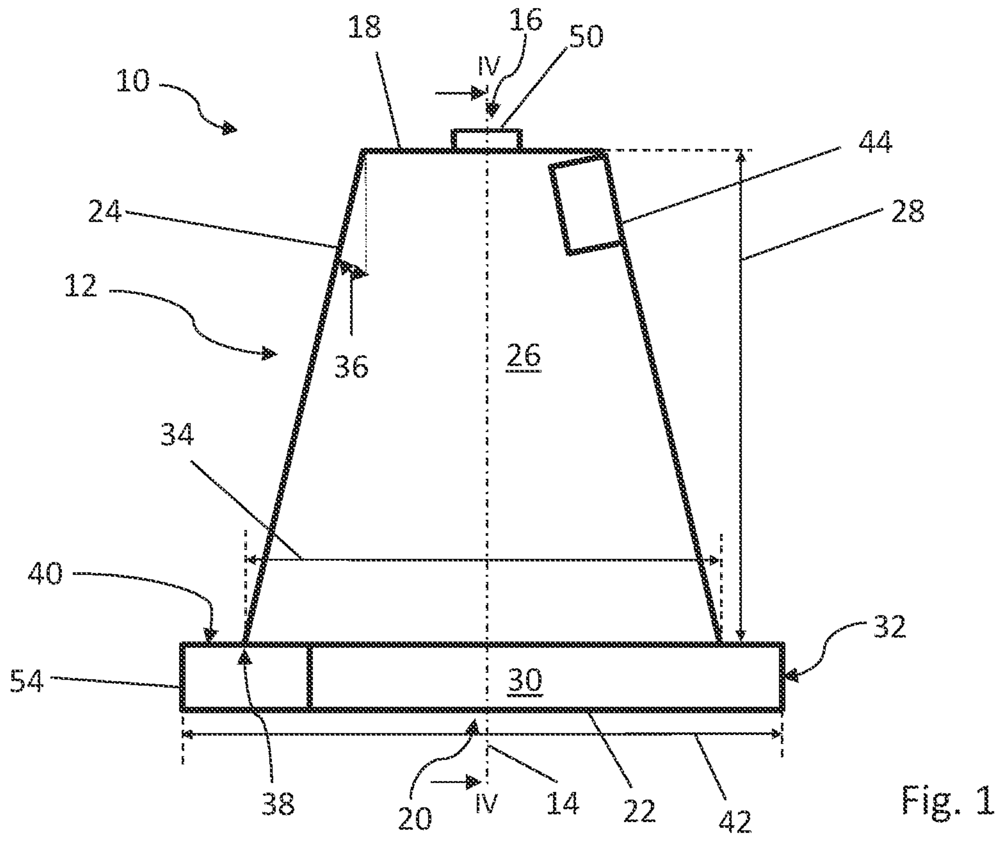
FIG. 1 shows a front view of one embodiment of a centrifugal separator.

In the drawing, a centrifugal separator is denoted as a whole by the reference sign 10.

Figure 2:
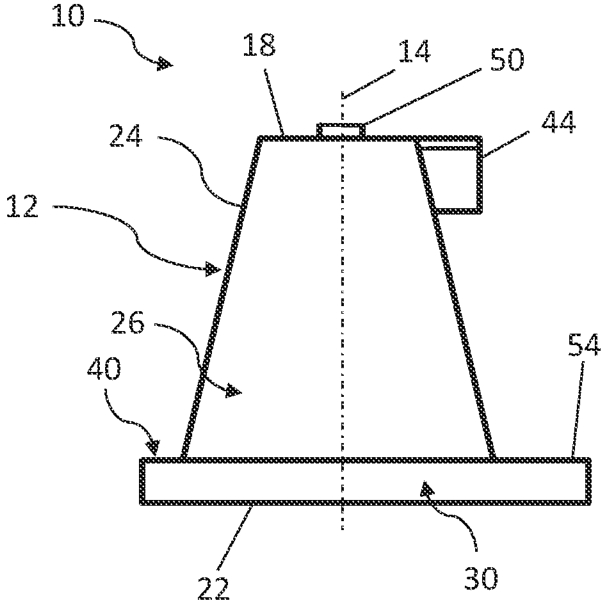
FIG. 2 shows a side view of the centrifugal separator according to FIG. 1.

The centrifugal separator 10 comprises a housing 12, which has a substantially rotationally symmetrical form with respect to a central axis 14; cf. FIG. 1 and FIG. 2. The central axis 14 extends between a first end 16 of the centrifugal separator 10 at which a top 18, extending perpendicular to the central axis 14, is formed and a second end 20 at which a bottom 22, extending perpendicular to the central axis 14, is formed.

The housing 12 has a separating chamber wall 24, which delimits a separating chamber 26 from the top 18 along the central axis 14, wherein the separating chamber 26 has a length 28 measured parallel to the central axis 14. The housing 12 has an expansion chamber 30, which is offset and arranged directly adjacent along the central axis 14 in relation to the separating chamber 26. The expansion chamber 30 is delimited by an expansion chamber wall 32 of the housing 12 and by the bottom 22 of the second end 20.

The separating chamber 26 has a conically widening form from the first end 18 in the direction of the expansion chamber 30, that is to say a diameter, measured perpendicularly in relation to the central axis 14, of the separating chamber 26 increases toward the expansion space 30 until a largest diameter 34 of the separating chamber 26 is reached. The conical widening of the separating chamber 26 is associated with a (negative) angle of inclination 36 of the separating chamber wall 24 relative to the central axis 14.

The separating chamber 26 leads into a boundary section 40, which is annular-disk-shaped and covers the expansion chamber 26, at an annular transition region 38. The transition region 38 may have a sharp-edged or rounded form.

The expansion chamber 30 has a diameter 42 measured perpendicularly in relation to the central axis 14. The diameter 42 of the expansion chamber 30 is larger than the largest diameter 34 of the separating chamber 26.

Figure 3:
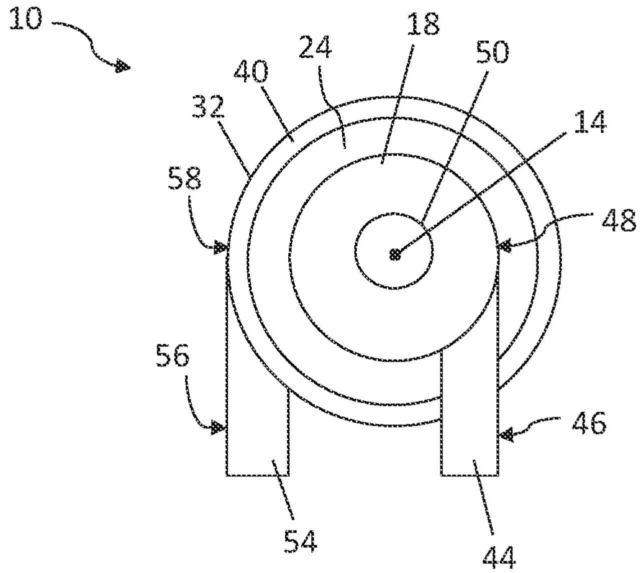
FIG. 3 shows a plan view of the centrifugal separator according to FIG. 1.
Figure 4:
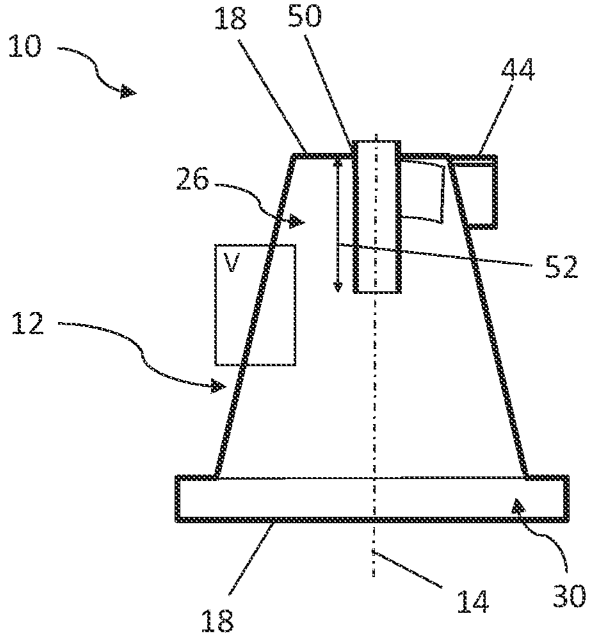
FIG. 4 shows a side view of the centrifugal separator along a sectional plane denoted IV-IV in FIG. 1 (central axis is in the sectional plane)

Close to the top 18, the separating chamber 26 is connected to an inlet channel 44 (cf. FIGS. 3 and 4). The inlet channel 44 preferably has a rectangular cross section. A boundary wall 46, which is on the outside with respect to the central axis 14, of the inlet channel 44 is in particular formed so as to tangentially adjoin a section 48 of the separating chamber wall 24; cf. FIG. 3.

An immersion tube 50 is arranged on the top 18 of the housing 12. The immersion tube 50 extends along the central axis 14 into the separating chamber 26; cf. FIG. 4. A length 52 of the immersion tube 50 that is accommodated in the separating chamber 26 is measured parallel to the central axis 14.

The expansion chamber 30 is connected to an outlet channel 54, wherein the outlet channel 54 preferably has a rectangular cross section. A boundary wall 56, which is on the outside with respect to the central axis 14, of the outlet channel 54 is in particular formed so as to tangentially adjoin a section 58 of the expansion chamber wall 32; cf. FIG. 3.

During operation of the centrifugal separator 10, the inlet channel 44 feeds a polyphasic fluid into the separating chamber 26, wherein the polyphasic fluid is composed in particular of fluid phases of different densities (light fraction and heavy fraction).

In the separating chamber 26, the polyphasic fluid is guided along an inner side 60 of the separating chamber wall 24, resulting in the formation of a flow which extends helically around the central axis 14 and has a flow component that points toward the expansion chamber 30.

The flow-induced centrifugal forces cause a radially outwardly directed acceleration, in particular of the heavy fraction, and the deposition of the heavy fraction on the inner side 60 of the separating chamber wall 24.

The light fraction undergoes a flow reversal in the vicinity of the bottom 22 and moves along the central axis 14 toward the immersion tube 50. The light fraction is discharged from the separating chamber 26 via the immersion tube 50.

Figure 5:
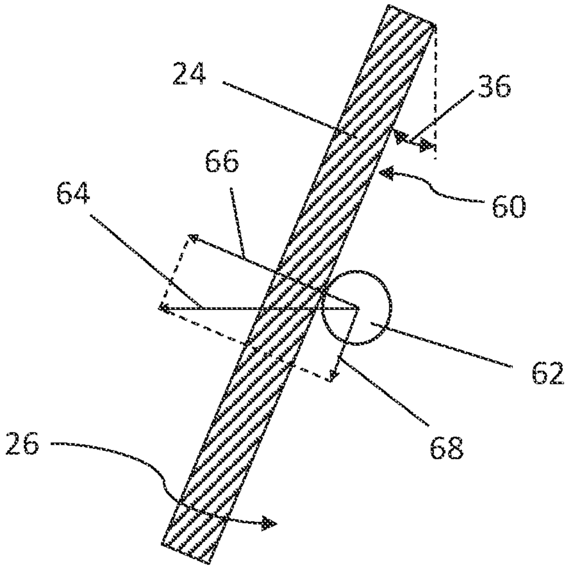
FIG. 5 shows an enlarged illustration of a detail, denoted V in FIG. 4, of a separating chamber wall.

A radially outwardly directed centrifugal force 64 also acts on the constituents 62 of the heavy fraction that are arranged on the inner side 60 of the separating chamber wall 24 after separation; cf. FIG. 5. The centrifugal force 64 has a first component 66 and a second component 68. The first component 66 acts on the constituents 62 of the heavy fraction as normal force and is aligned perpendicularly in relation to the inner side 60 of the separating chamber wall 24.

The second component 68 of the centrifugal force 64 is aligned parallel to the inner side 60 of the separating chamber wall 24. As a result of the conical widening of the separating chamber 26 along the central axis 14, the second component 68 of the centrifugal force 64 is aligned toward the expansion chamber 30. This causes an acceleration of the constituents 62 of the heavy fraction toward the expansion chamber 30 and an increased rate at which they are transported away from the separating chamber 26 into the expansion chamber 30.

The magnitude of the second component 68 of the centrifugal force 64 depends on the magnitude of the angle of inclination 36. A larger angle of inclination 36 measured with respect to the central axis 14 is associated with a second component 68 of the centrifugal force 64 that is larger in absolute terms.

If the constituents 62 of the heavy fraction are present in the expansion chamber 30, the enlarged diameter 42 of the expansion chamber 30 causes the rotational speed of the heavy fraction to decelerate, and the heavy fraction is discharged from the expansion chamber 30 via the outlet channel 54; cf. FIG. 1, for example.

Operating states of the centrifugal separator 10 during which constituents 62 of the heavy fraction accumulate on the bottom 18 are conceivable. As a result, the discharge of the constituents 62 of the heavy fraction out of the expansion chamber 30 can be adversely affected.

Figure 6:
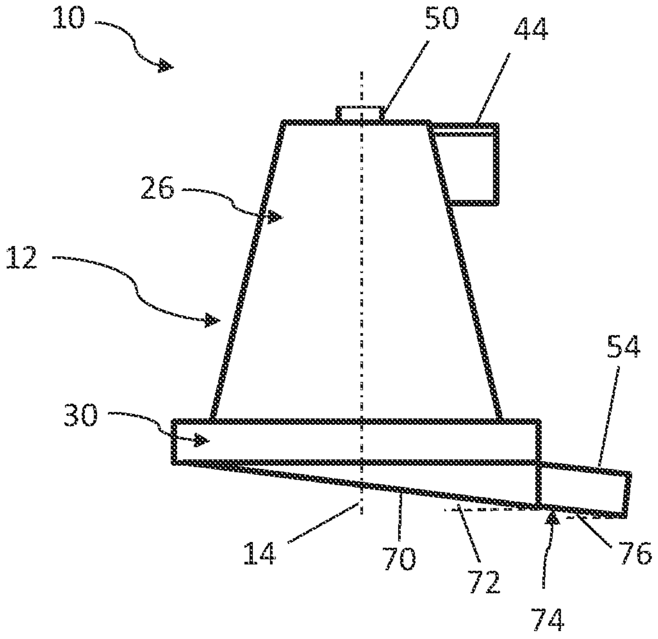
FIG. 6 shows a side view of a further embodiment of a centrifugal separator.

In order to improve the discharge of the heavy fraction from the expansion chamber 30, in a further embodiment of the centrifugal separator 10 there is provided a first fluid discharge section 70, which is spaced apart from the central axis 14, is on the bottom and, with respect to an orientation perpendicular to the central axis 14, has a slope 72 which is similar to a screw thread; cf. FIG. 6.

It is also possible to achieve an improvement in the discharge of the heavy fraction with a bottom section 74 of the outlet channel 54, wherein the bottom section 74, with respect to an orientation perpendicular to the central axis 14, has an outlet channel slope 76.

Operating states are also conceivable during which a heavy fraction proportion in the expansion chamber 30 and/or the separating chamber 26 stably rotates close to the central axis 14 and as a result does not reach the outlet channel 54. To avoid such operating states, fluid guiding sections on the bottom are provided in further embodiments of the centrifugal separator 10.

Figure 7:
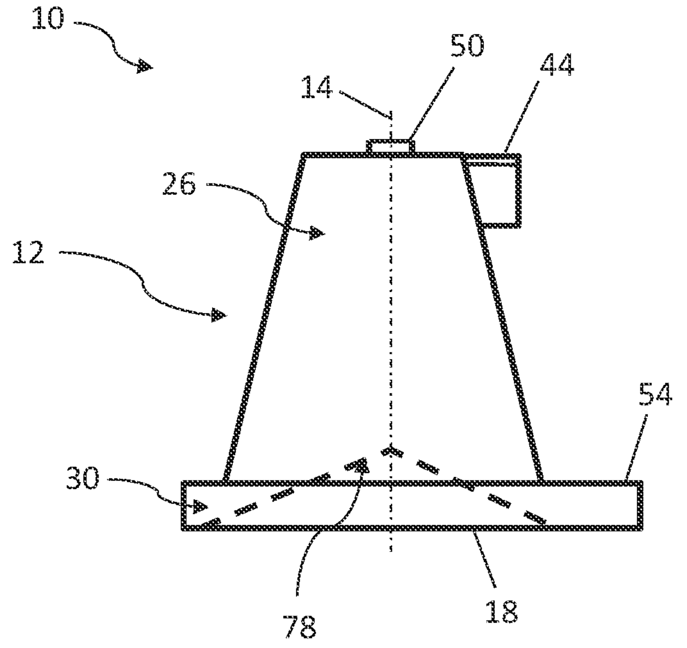
FIG. 7 shows a side view of a further embodiment of the centrifugal separator.
Figure 8:
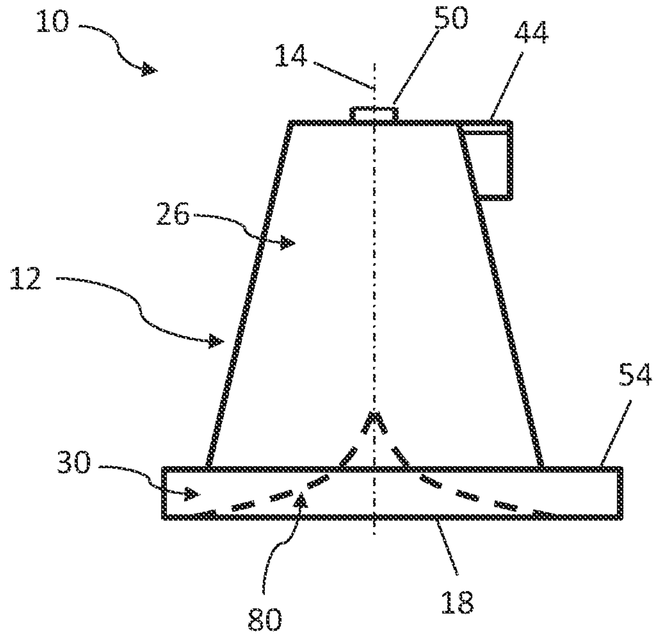
FIG. 8 shows a side view of a further embodiment of the centrifugal separator.

For example, a frustoconical fluid guiding section 78 is provided; cf. FIG. 7, or a pagoda-shaped fluid guiding section 80 is provided; cf. FIG. 8. The fluid guiding sections 78, 80 extend annularly around the respective central axis 14. The tops of the fluid guiding sections 78, 80 that face the separating chamber 26 or the expansion chamber 30 form inclined guide surfaces for guiding the constituents 62 of the heavy fraction radially outward, in particular toward the outlet channel 54.

The invention claimed is:

1. A centrifugal separator (10) comprising a housing (12), which extends along a central axis (14) and has a separating chamber wall (24) for delimiting a separating chamber (26) that is fed by an inlet channel (44) for polyphasic fluid, wherein a central immersion tube (50) is provided for discharging a first fluid phase and an outlet channel (54) is provided for discharging a second fluid phase, wherein an expansion chamber (30), which widens radially outward with respect to the separating chamber (26) and is radially outwardly delimited by an expansion chamber wall (32), is provided between the separating chamber (26) and the outlet channel (54), wherein the separating chamber (26) conically widens from the inlet channel (44), as seen along the central axis (14), toward the expansion chamber (30), wherein a diameter (42) of the expansion chamber (30) measured perpendicularly to the central axis (14) is larger than a largest diameter (34) of the separating chamber (26) measured perpendicular to the central axis (14), wherein the separating chamber (26) opens at an annular transition region (38) into an annular-disk-shaped boundary portion (40) covering the expansion chamber (30), wherein the annular transition region (38) between an end of the separating chamber wall (24) and the boundary portion (40) covering the expansion chamber (30) is sharp-edged or rounded, and wherein the outlet channel (54) has an outer boundary wall (56) with respect to the central axis (14), which tangentially adjoins a portion (58) of the expansion chamber wall (32).

2. The centrifugal separator (10) according to claim 1, wherein an angle of inclination (36), measured relative to the central axis (14), of the separating chamber wall (24) is between 2° and 20°.

3. The centrifugal separator (10) according to claim 1, wherein the immersion tube (50) extends over at most 60% of a length (28), measured along the central axis (14), of the separating chamber (26).

4. The centrifugal separator (10) according to claim 3, wherein a ratio between the length (28), measured along the central axis (14), of the separating chamber (26) and the largest diameter (34) of the separating chamber (26) is between 6:1 and 1:1.

5. The centrifugal separator (10) according to claim 1, wherein the expansion chamber (30) comprises a fluid discharge section (70), which is spaced apart from the central axis (14), is on a bottom and, with respect to an orientation perpendicular to the central axis (14), has a slope (72) which is similar to a screw thread and assists the discharge of the second fluid phase.

6. The centrifugal separator (10) according to claim 1, wherein the outlet channel (54) comprises a bottom section (74), which, with respect to an orientation perpendicular to the central axis (14), has an outlet channel slope (76) which assists the discharge of the second fluid phase.

7. The centrifugal separator (10) according to claim 1, wherein the expansion chamber (30) has a fluid guiding section (78) which extends around the central axis (14) in frustoconical or pagoda-shaped fashion and is on a bottom.

8. The centrifugal separator (10) according to claim 1, wherein the inlet channel (44) has a boundary wall (46), which is on an outside with respect to the central axis (14) and tangentially adjoins a section (48) of the separating chamber wall (24).

9. The centrifugal separator (10) according to claim 1, wherein the inlet channel (44) has a rectangular cross section, the outlet channel (54) has a rectangular cross section, or the inlet channel (44) and outlet channel (54) have a rectangular cross section.

10. The centrifugal separator (10) according to claim 2, wherein the angle of inclination (36) is between 2.5° and 15°.

* * * * *